(12) United States Patent
Aralikatte et al.

(10) Patent No.: US 10,262,157 B2
(45) Date of Patent: Apr. 16, 2019

(54) APPLICATION RECOMMENDATION BASED ON PERMISSIONS

(71) Applicant: International Business Machines Corporation, Armonk, NY (US)

(72) Inventors: Rahul Rajendra Aralikatte, Bangalore (IN); Vijay Ekambaram, Chennai (IN); Senthil Kumar Kumarasamy Mani, Bangalore (IN); Giriprasad Sridhara, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 15/279,166

(22) Filed: Sep. 28, 2016

(65) Prior Publication Data

US 2018/0089452 A1    Mar. 29, 2018

(51) Int. Cl.
| | |
|---|---|
| *G06F 21/62* | (2013.01) |
| *G06F 8/60* | (2018.01) |
| *G06F 11/30* | (2006.01) |

(52) U.S. Cl.
CPC .............. *G06F 21/629* (2013.01); *G06F 8/60* (2013.01); *G06F 11/30* (2013.01)

(58) Field of Classification Search
None
See application file for complete search history.

(56) References Cited

U.S. PATENT DOCUMENTS

| | | | |
|---|---|---|---|
| 8,769,676 B1 * | 7/2014 | Kashyap | G06F 21/554 726/22 |
| 8,832,846 B2 | 9/2014 | Udani | |
| 2003/0023726 A1 * | 1/2003 | Rice | H04W 8/16 709/225 |

(Continued)

OTHER PUBLICATIONS

Zhu, Hengshu et al., "Mobile App Recommendations with Security and Privacy Awareness", KDD '14, Aug. 24-27, 2014, New York, NY, USA, 10 pages, ACM Digital Library.

(Continued)

*Primary Examiner* — Piotr Poltorak
(74) *Attorney, Agent, or Firm* — Ference & Associates LLC

(57) ABSTRACT

One embodiment provides a method, including: tracking behavior of a user when the user is providing input to a permission request of an application, wherein the permission request comprises at least one application permission requesting access for the application to information accessible by an information handling device; identifying at least one undesired application permission, wherein the identifying comprises detecting, based upon the behavior of the user, that the user is uncomfortable with the at least one undesired application permission; determining whether another similar application, having a permission set the user is comfortable with, is available, wherein the determining comprises searching for applications similar to the application and filtering the similar applications by removing applications having a permission similar to the undesired application permission; and providing a recommendation, if there is another similar application, to the user, wherein the recommendation comprises the another similar application.

17 Claims, 4 Drawing Sheets

(56) References Cited

U.S. PATENT DOCUMENTS

| | | | |
|---|---|---|---|
| 2003/0043180 A1* | 3/2003 | Gusler | G06F 9/453 715/708 |
| 2003/0046444 A1* | 3/2003 | Murray | G06F 9/44505 719/320 |
| 2005/0049868 A1* | 3/2005 | Busayapongchai | G10L 15/01 704/251 |
| 2006/0074880 A1* | 4/2006 | Bukary | G06Q 10/00 |
| 2006/0094400 A1* | 5/2006 | Beachem | H04L 63/101 455/410 |
| 2006/0206565 A1* | 9/2006 | Ganesan | H04N 7/17336 709/204 |
| 2007/0016572 A1* | 1/2007 | Bates | G06F 3/0236 |
| 2007/0040799 A1* | 2/2007 | Singh | G06F 3/013 345/156 |
| 2007/0083541 A1* | 4/2007 | Fraleigh | G06F 17/245 |
| 2008/0256643 A1* | 10/2008 | Jones | G06F 21/629 726/27 |
| 2010/0010990 A1* | 1/2010 | Tsukamoto | G06F 17/30707 707/E17.014 |
| 2011/0047594 A1* | 2/2011 | Mahaffey | G06F 21/564 726/1 |
| 2011/0126188 A1* | 5/2011 | Bernstein | G06F 11/0751 717/174 |
| 2012/0117127 A1* | 5/2012 | MacDonald | G06F 8/62 707/822 |
| 2013/0036448 A1* | 2/2013 | Aciicmez | G06F 21/6218 726/1 |
| 2013/0083976 A1* | 4/2013 | Ragland | G06F 3/011 382/117 |
| 2013/0185292 A1* | 7/2013 | Li | G06F 17/30522 707/723 |
| 2013/0326465 A1* | 12/2013 | Jain | G06F 8/77 717/100 |
| 2014/0047083 A1* | 2/2014 | Ichikawa | H04L 41/08 709/220 |
| 2014/0173319 A1* | 6/2014 | Zeng | G06F 11/3013 713/340 |
| 2014/0201655 A1* | 7/2014 | Mahaffey | G06F 3/04817 715/765 |
| 2014/0282371 A1* | 9/2014 | Hirsch | G06F 8/36 717/106 |
| 2014/0310372 A1* | 10/2014 | Zhao | H04L 67/2842 709/213 |
| 2015/0100434 A1* | 4/2015 | Sanghavi | G06Q 30/0273 705/14.69 |
| 2016/0098566 A1* | 4/2016 | Patil | G06F 21/60 726/26 |
| 2016/0112431 A1 | 4/2016 | Biswas | |
| 2016/0191534 A1* | 6/2016 | Mallozzi | G06F 21/6218 726/4 |
| 2017/0011557 A1* | 1/2017 | Lee | G06F 3/013 |

OTHER PUBLICATIONS

Liu, Bin et al., "Personalized Mobile App Recommendation: Reconciling App Functionality and User Privacy Preference", WSDM '15, Feb. 2-6, 2015, Shanghai, China, 10 pages, ACM Digital Library.

Mandaliya, Viral et al., "Permission Based Risk Communication for Android Apps", International Research Journal of Engineering and Technology (IRJET), vol. 3, Issue 04, Apr. 2016, 4 pages, www.irjet.net.

* cited by examiner

APPLICATION RECOMMENDATION BASED ON PERMISSIONS

BACKGROUND

Many users have devices (e.g., tablets, smart phones, smart watches, gaming systems, computers, etc.) on which the user can download and/or install applications (e.g., games, banking applications, reminder applications, calendars, etc.). When the user downloads and/or installs the application, the application may provide a permissions screen to the user which requests access to different sensors or information of the device. For example, when a user downloads and/or installs an application, the application may request access to location information, social media accounts, internal memory, external memory, and the like. The user may then accept all or some of the permission requests. Alternatively, as the application attempts to execute a process that requires access to different sensors or information of the device, the application may provide a permission request for the sensors or information necessary for carrying out that particular process. For example, when a user tries to request a route using a map application, the map application may request permission to access sensors or information on the device to determine the user's current location.

BRIEF SUMMARY

In summary, one aspect of the invention provides a method, comprising: utilizing at least one processor to execute computer code that performs the steps of: tracking behavior of a user when the user is providing input to a permission request of an application, wherein the permission request comprises at least one application permission requesting access for the application to information accessible by an information handling device; identifying at least one undesired application permission, wherein the identifying comprises detecting, based upon the behavior of the user, that the user is uncomfortable with the at least one undesired application permission; determining whether another similar application, having a permission set the user is comfortable with, is available, wherein the determining comprises searching for applications similar to the application and filtering the similar applications by removing applications having a permission similar to the undesired application permission; and providing a recommendation, if there is another similar application, to the user, wherein the recommendation comprises the another similar application.

Another aspect of the invention provides an apparatus, comprising: at least one processor; and a computer readable storage medium having computer readable program code embodied therewith and executable by the at least one processor, the computer readable program code comprising: computer readable program code that tracks behavior of a user when the user is providing input to a permission request of an application, wherein the permission request comprises at least one application permission requesting access for the application to information accessible by an information handling device; computer readable program code that identifies at least one undesired application permission, wherein the identifying comprises detecting, based upon the behavior of the user, that the user is uncomfortable with the at least one undesired application permission; computer readable program code that determines whether another similar application, having a permission set the user is comfortable with, is available, wherein the determining comprises searching for applications similar to the application and filtering the similar applications by removing applications having a permission similar to the undesired application permission; and computer readable program code that provides a recommendation, if there is another similar application, to the user, wherein the recommendation comprises the another similar application.

An additional aspect of the invention provides a computer program product, comprising: a computer readable storage medium having computer readable program code embodied therewith, the computer readable program code executable by a processor and comprising: computer readable program code that tracks behavior of a user when the user is providing input to a permission request of an application, wherein the permission request comprises at least one application permission requesting access for the application to information accessible by an information handling device; computer readable program code that identifies at least one undesired application permission, wherein the identifying comprises detecting, based upon the behavior of the user, that the user is uncomfortable with the at least one undesired application permission; computer readable program code that determines whether another similar application, having a permission set the user is comfortable with, is available, wherein the determining comprises searching for applications similar to the application and filtering the similar applications by removing applications having a permission similar to the undesired application permission; and computer readable program code that provides a recommendation, if there is another similar application, to the user, wherein the recommendation comprises the another similar application.

A further aspect of the invention provides a method, comprising: utilizing at least one processor to execute computer code that performs the steps of: identifying an undesired application permission of an application, wherein the application permission requests access for the application to information accessible by an information handling device and wherein the identifying comprises detecting, based upon behavior of a user, that the user is uncomfortable with the undesired application permission; searching, using a similarity algorithm, for applications having features similar to the application having the undesired application permission and having a permission set that does not include the undesired application permission; determining that no applications are available having similar features and a permission set that does not include the undesired application permission; and providing a recommendation to an application developer, wherein the recommendation recommends that an application be developed without the undesired application permission.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
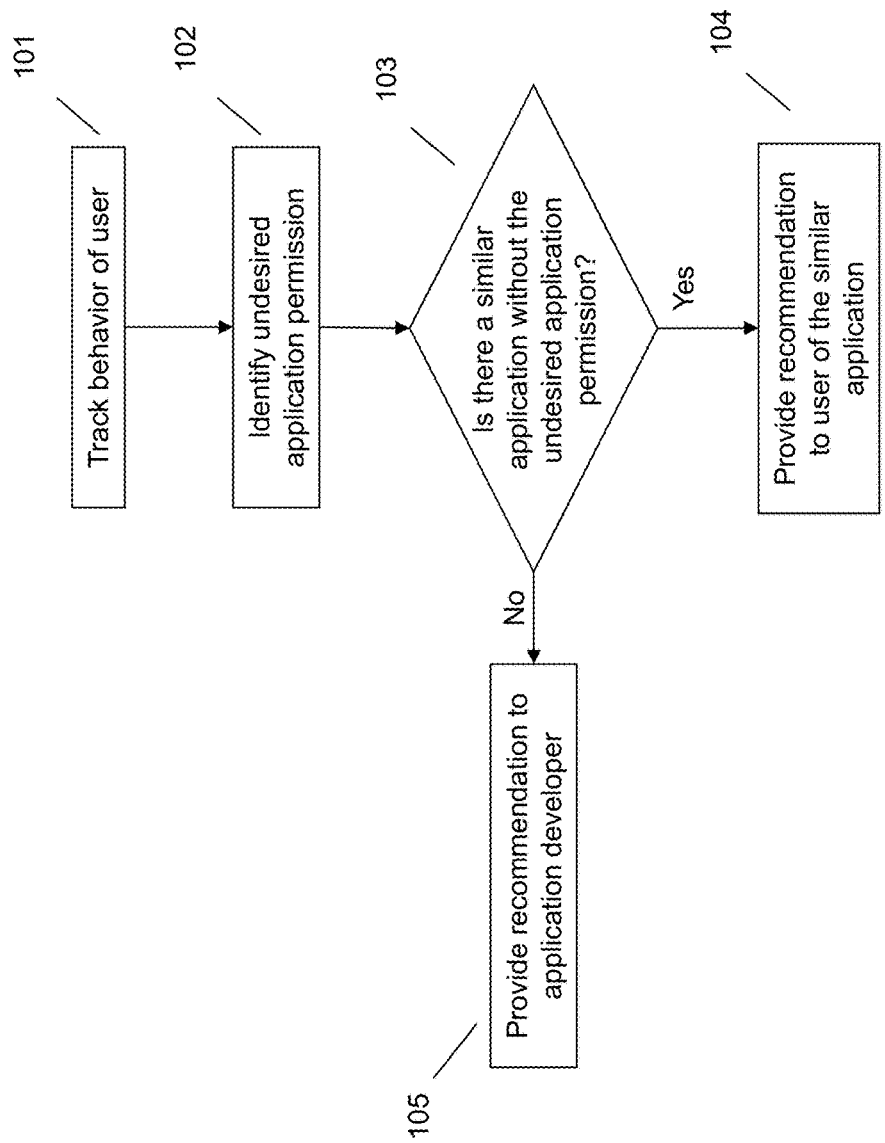
FIG. 1 illustrates a method of recommending an application based upon application permissions.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

In denying a permission request of the application, a user may not be able to use all the features of the application or the application may not function properly. Thus, a user may agree to the permission request even if the user does not actually want the application to access the requested sensors or information. Additionally, in some cases the user only has the option to accept all the permission requests, for example, when the permission requests are presented in a single request. Thus, if the user does not want the application to access some of the sensors or information, the user does not have a method for only selecting the permissions that the user finds acceptable. Accordingly, a user may desire to find an application that serves the same function as the selected application but does not require access to the undesired sensors or information.

However, current systems that provide recommendations, for example, for applications to a user, do not take into consideration the permissions that a user finds acceptable. Rather, the system may recommend applications having similar features as the selected application. For example, if a user is attempting to download and/or install a note-taking application, the system may recommend a different note-taking application. Some of the recommendations may be based upon applications that have been previously downloaded by the user. For example, a user may download multiple applications developed by particular developers, so applications that are provided as recommendations may include other applications developed by the same developers. Recommendations may also be based upon a category of applications that a user prefers to download. For example, if a user frequently downloads time management games, recommendations may include recommendations for other time management games. A system may also recommend applications based upon applications downloaded by other users having a relationship with the user. For example, a recommended application may include an application downloaded by a user's social media friends. Thus, the current systems for providing recommendations fail to consider the security or permission preferences of the user.

Accordingly, an embodiment provides a method of recommending applications to users based upon the user's permission preferences. An embodiment may track the behavior of a user when the user is providing input to a permission request of an application. For example, when a user is downloading and/or installing an application, the application may make a request for permission to access information of the device (e.g., sensors, memory, information stored on the device, social media accounts, email accounts, etc.). When the user is deciding on the permissions to allow, an embodiment may track the user. An embodiment may identify at least one undesired application permission. The identifying may include detecting or identifying that the user is uncomfortable with one of the application permission requests based upon the user's behavior. For example, if the user hesitates before selecting the permission, the system may identify that the user may be uncomfortable with that permission.

Once an undesired application permission has been identified, an embodiment may determine whether another application is available that has features similar to those of the application having the undesired application permission. An embodiment may search for and find all the similar applications and then filter these applications to a subset including only those applications having a permission set that does not include the undesired application permission. If an application is available that is similar to the target application (e.g., the application the user was downloading or installing, the application having the undesired permissions, etc.) and also does not have the undesired permission, an embodiment may recommend the application(s) to the user. Alternatively, if no application is available that fulfills all the conditions, an embodiment may store the undesired permission as a requirement. The stored requirements may be accessible by application developers. An embodiment may recommend that the application developer develop an application without the undesired permission.

Such a system provides a significant technical improvement over current systems providing recommendations. The systems and methods as described herein provide an application recommender that identifies similar applications having permissions that are desired by a user. The system identifies permissions that a user may be uncomfortable with or finds undesirable and then recommends applications which may have similar features as the target application but which do not require access to the sensor or information that the user finds unacceptable. Additionally, the systems and methods as described herein provide an improvement to application development systems in that the system keeps track of undesired permissions and recommends, to application developers, applications for developing that do not require the undesired permissions. The system may receive identification of undesired permissions from a large plurality of users and is then able to identify which permission is the least desired or most important to users. The application developers can use this information to develop applications which are more desirable to a larger number of users.

Figure 2:
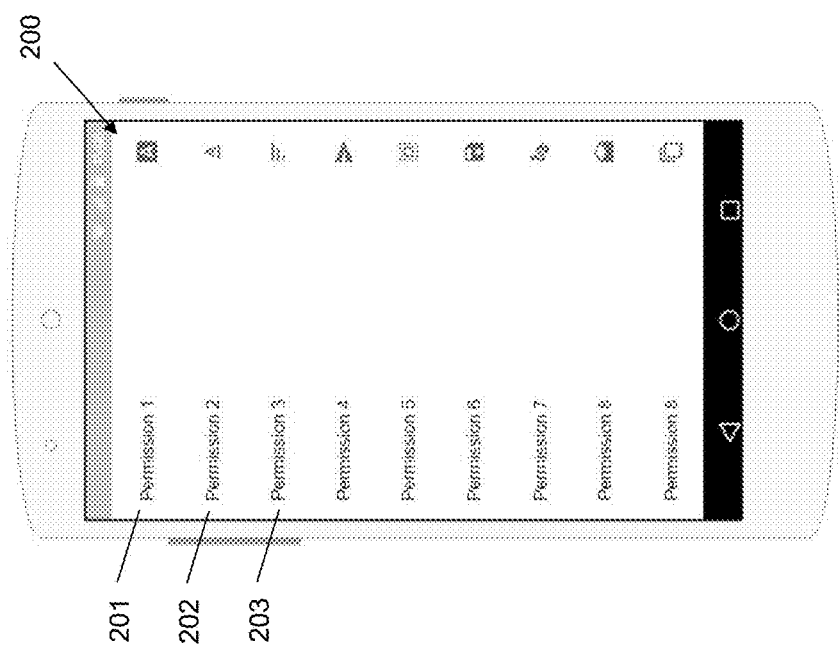
FIG. 2 illustrates an example permission request screen for an application.
Figure 3:
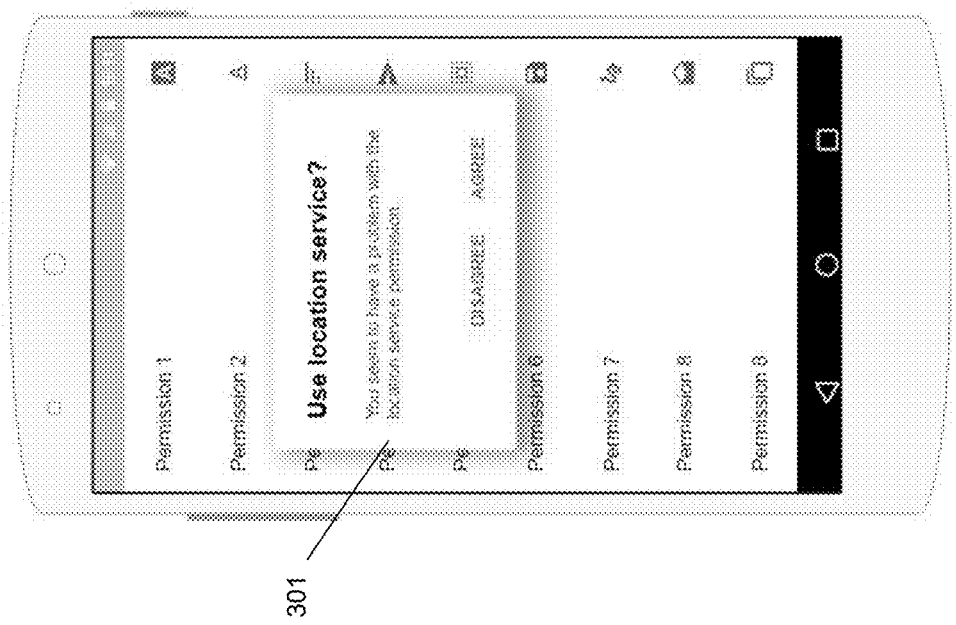
FIG. 3 illustrates an example identification of an undesirable permission.

Referring now to FIG. 1, an embodiment may track the behavior of a user when the user is providing input to a permission request of an application. The permission request may include at least one application permission that is requesting access to information on, or accessible by, the device. An example permission request display 200 is shown in FIG. 2. Each of the labeled permissions may be requesting access to a different sensor or information on or accessible by the device. For example, Permission 1 201 may be requesting access to location information of the device, Permission 2 202 may be requesting access to social media accounts, Permission 3 203 may be requesting access to other applications on the device, and the like.

As shown in FIG. 2, the permission request may include a single display screen with multiple permission requests, for example, as may be displayed when the user is downloading and/or installing the application. At this display screen the user may be able to select one or more of the permission requests to accept or decline. Alternatively, the user may not have the option to only select a few permissions. Rather, the user may have to accept or decline all the permission requests. Declining some or all of the permission requests may result in the application not performing correctly, features of the application not functioning, or the application failing installation, and the like.

As an alternative to the single display, a permission request screen may be presented every time, or the first time, that the application is attempting to access a sensor or information from the device. For example, after the user has installed the application, the application may want to access the user's social media accounts. Upon the first attempt to access the user's social media account, the application may provide a prompt or display to the user requesting access to the social media accounts. At this point the user may accept/allow or decline/block the application from accessing the requested sensor or information. Again, declining the permission may result in some features of the application being inaccessible.

As the user is deciding whether to accept or decline the permission request, the system may track the behavior of the user. Tracking the behavior of the user may include tracking the user's gestures or movements, gaze or eyes, audio patterns or mouth, and the like. For example, as the user is reading the permission request and deciding whether to accept or decline the request, the system may track the user's hands or fingers. As another example, as the user is reading the permission request, an embodiment may capture audio information if the user speaks. The tracking may be completed with sensors on the device or using sensors accessible by the device. For example, tracking the user's gestures may be performed using capacitive sensors on the device's touch screen. As another example, tracking the user's gaze may be performed using a camera installed on a smart watch accessible by a user's smart phone. As can be understood by one skilled in the art, these are merely examples and not intended to be limiting.

At 102 an embodiment may identify one or more undesired application permissions. An undesired application permission may be an application permission that the user seems uncomfortable with or the user seems hesitant to allow. To determine that the application permission is undesirable, an embodiment may use the behavior of the user that was tracked at 101. Using actions of, explicit communication by, or other behavior of the user, the system may infer that the user is uncomfortable with or hesitant about the application permission request. As an example, while tracking the gestures of a user, an embodiment may identify that the user hesitated by hovering his or her finger over the permission request box. Determining that the user hesitated may include identifying that the user's hand or finger was over the screen of the device for a predetermined amount of time (e.g., ten seconds, two seconds, thirty seconds, etc.). The predetermined amount of time may be a default amount or selected by the user. In this example, the identification of the user's hand hovering may be accomplished using a camera, capacitive sensors of the touch screen, and the like.

Some embodiments may use a combination of user behavior to identify that the user is uncomfortable with a permission request. For example, if the system has identified that the user's hand was above the device screen for an extended time, an embodiment may also use gaze tracking information to identify which permission the user was looking at while his/her hand was hovering over the screen. The system may then infer that the user is uncomfortable with the permission request that the user was looking at when it detected that the user's hand was hovering over the screen for an extended time. The system may also use communications by the user to identify that an application permission is undesirable. For example, while looking at the application permission requests, a user may say "I don't want them to know my location." The system may then infer that the user is uncomfortable with the location permission request based upon this captured audio. The user may also provide user input indicating that a permission request is undesired. For example, referring to FIG. 3, an embodiment may identify that the user may be uncomfortable with the location service permission. Accordingly, an embodiment may provide a prompt 301, requesting the user to confirm whether the permission is undesirable.

At 103 an embodiment may determine whether another similar application is available. To make this determination, an embodiment may search for applications having features similar to those of the application having the undesired permission. Similar features may include application type, application developer, application category, applications downloaded by contacts, and the like. The search for the similar applications may be performed using standard application search techniques. An embodiment may then filter the similar applications to remove any applications having the same or similar undesired permission.

The applications removed do not have to have the same permission as the permission identified as undesirable. For example, if the permission request that has been identified as undesirable is a request for accessing internal memory, an application having a permission requesting access to external memory may be considered similar to the undesired permission. Alternatively, the system may be set to only remove applications having the same permission request. An embodiment may also perform an iterative search. For example, an embodiment may perform a search in which all applications having permission requests which are similar are removed. Based upon the results of the filter, for example, if no applications remain, the user does not like any of the remaining applications, and the like, the system may remove the stricter filter and perform the filtering again with a less strict filter, for example, a filter that only removes applications having the same permission request.

If, at 103, an embodiment determines that at least one similar application having an acceptable permission set is available, an embodiment may provide a recommendation to the user at 104. The recommendation may include the one or more similar applications. The recommendation may include a display showing or listing each of the similar applications. Such a recommendation may also include information about the application including the permission set of the application. Alternatively, an embodiment may inform the user that similar applications having an acceptable permission set are available and requesting that the user confirm if these applications should be displayed.

If, at 103, no similar application or only a few similar applications having an acceptable permission set are available, an embodiment may store the undesired application permission as a requirement. An embodiment may provide a recommendation to an application developer including the requirement at 105. The recommendation may be displayed to the developer when the developer indicates that he/she is developing a new application or when the developer accesses the information storage location where the requirement has been stored. The recommendation could also be displayed within a development community as an application that should be developed, where the application has particular features and a permission set not including the undesired permission set. The recommendation may also be sold to application developers, application stores, and the like, using various payment models.

The requirement may be stored in an application store, application development site, or other information storage location. An embodiment may collect and store these requirements from a plurality of users across many different platforms. The system may also store additional information related to the requirement. For example, an embodiment may calculate and store the number of users who have identified the permission as an undesired permission. As another example, an embodiment may identify and store a profile associated with the users identifying the permission as an undesired permission. As an example of a profile, the system may identify that users over a particular age have identified a particular requirement as undesirable. As another example, an embodiment may identify that users who download a particular type of application have identified a particular requirement as undesirable.

Using the requirement and additional information which may be associated with the requirement, an embodiment may estimate or assign an importance score to the requirement. For example, as more users identify a requirement as undesirable the importance score may increase. As another example, if users who have a profile similar to a profile of a user targeted for the application identify a requirement as undesirable, the importance score may increase. In this example, the importance score may not change if the user who is providing the undesirable requirement does not match the profile of the targeted user. Once the importance score reaches or exceeds a predetermined threshold, the system may suggest the requirements to application developers for product development. This recommendation may be performed similarly to the recommendation as discussed above.

Figure 4:
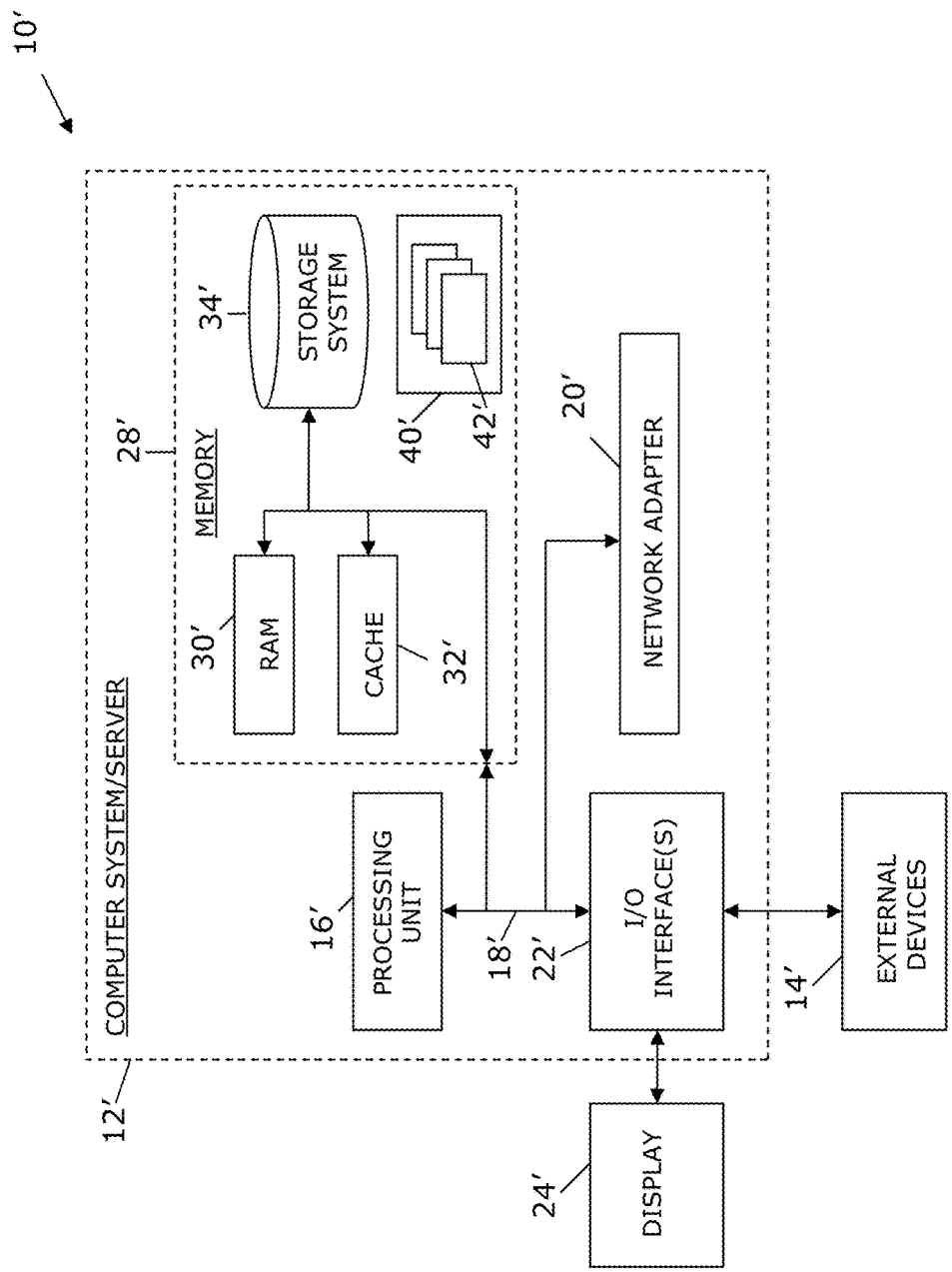
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
tracking, using at least one sensor of an information handling device, behavior of a user when the user is providing input to a permission request of an application, wherein the permission request comprises at least one application permission requesting access for the application to information accessible by the information handling device, wherein the tracking behavior of the user comprises tracking non-selection input behavior of the user comprising behavior other than user selection inputs provided to the permission request of the application;
identifying at least one undesired application permission, wherein the identifying comprises inferring from the behavior of the user that the user is uncomfortable with the at least one undesired application permission by tracking a gaze of the user to identify an application permission associated with the gesture that exceeds a predetermined time frame;
determining whether another similar application, having a permission set the user is comfortable with, is available, wherein the determining comprises searching for applications similar to the application and filtering the similar applications by removing applications having a permission similar to the undesired application permission;
providing a recommendation, if there is another similar application, to the user, wherein the recommendation comprises the another similar application; and
storing, if there is not another similar application, the undesired application permission as an application development requirement for use in developing new applications not having the undesired application permission.

2. The method of claim 1, wherein the tracking behavior of the user comprises analyzing gestures of the user.

3. The method of claim 2, wherein the detecting that the user is uncomfortable comprises detecting that a gesture of the user exceeds a predetermined time frame.

4. The method of claim 1, comprising providing the requirement as a recommendation, to an application developer, to not include the undesired application permission in an application.

5. The method of claim 1, comprising assigning an importance score to the requirement.

6. The method of claim 5, wherein the importance score is based upon how many users have identified the application permission as undesirable.

7. The method of claim 5, wherein the importance score is based upon a profile of the user finding the application permission as undesirable.

8. The method of claim 5, comprising providing the requirement as a recommendation to an application developer when the importance scores reaches a predetermined threshold.

9. An apparatus, comprising:
at least one processor; and
a non-transitory computer readable storage medium having computer readable program code embodied therewith and executable by the at least one processor, the computer readable program code comprising:
computer readable program code that tracks, using at least one sensor of an information handling device, behavior of a user when the user is providing input to a permission request of an application, wherein the permission request comprises at least one application permission requesting access for the application to information accessible by the information handling device, wherein the tracking behavior of the user comprises tracking non-selection input behavior of the user comprising behavior other than user selection inputs provided to the permission request of the application;
computer readable program code that identifies at least one undesired application permission, wherein the identifying comprises inferring from the behavior of the user that the user is uncomfortable with the at least one undesired application permission by tracking a gaze of the user to identify an application permission associated with the gesture that exceeds a predetermined time frame;
computer readable program code that determines whether another similar application, having a permission set the user is comfortable with, is available, wherein the determining comprises searching for applications similar to the application and filtering the similar applications by removing applications having a permission similar to the undesired application permission;
computer readable program code that provides a recommendation, if there is another similar application, to the user, wherein the recommendation comprises the another similar application; and
computer readable program code that stores, if there is not another similar application, the undesired application permission as an application development requirement for use in developing new applications not having the undesired application permission.

10. A computer program product, comprising:
a non-transitory computer readable storage medium having computer readable program code embodied therewith, the computer readable program code executable by a processor and comprising:
computer readable program code that tracks, using at least one sensor of an information handling device, behavior of a user when the user is providing input to a permission request of an application, wherein the permission request comprises at least one application permission requesting access for the application to information accessible by the information handling device, wherein the tracking behavior of the user comprises tracking non-selection input behavior of the user comprising behavior other than user selection inputs provided to the permission request of the application;
computer readable program code that identifies at least one undesired application permission, wherein the identifying comprises inferring from the behavior of the user that the user is uncomfortable with the at least one undesired application permission by tracking a gaze of the user to identify an application permission associated with the gesture that exceeds a predetermined time frame;
computer readable program code that determines whether another similar application, having a permission set the user is comfortable with, is available, wherein the determining comprises searching for applications similar to the application and filtering the similar applications by removing applications having a permission similar to the undesired application permission;
computer readable program code that provides a recommendation, if there is another similar application, to the user, wherein the recommendation comprises the another similar application; and
computer readable program code that stores, if there is not another similar application, the undesired application permission as an application development requirement for use in developing new applications not having the undesired application permission.

11. The computer program product of claim 10, wherein the tracking behavior of the user comprises analyzing gestures of the user.

12. The computer program product of claim 11, wherein the identifying that the user is uncomfortable comprises detecting that a gesture of the user exceeds a predetermined time frame.

13. The computer program product of claim 10, comprising providing the undesired application permission as a recommendation, to an application developer, to not include the undesired application permission in an application.

14. The computer program product of claim 10, comprising assigning an importance score to the undesired application permission.

15. The computer program product of claim 14, wherein the importance score is based upon how many users have identified the application permission as undesirable.

16. The computer program product of claim 14, comprising providing the requirement as a recommendation to an application developer when the importance scores reaches a predetermined threshold.

17. A method, comprising:
utilizing at least one processor to execute computer code that performs the steps of:
identifying an undesired application permission of an application, wherein the application permission requests access for the application to information accessible by an information handling device and wherein the identifying comprises inferring from behavior of a user that the user is uncomfortable with the undesired application permission, wherein the behavior of the user is tracked, using at least one sensor of the information handling device, and comprises tracking non-selection input behavior of the user comprising behavior other than user selection inputs provided to the permission request of the application, wherein the tracking comprises tracking a gaze of the user to identify an application permission associated with the gesture that exceeds a predetermined time frame;
searching, using a similarity algorithm, for applications having features similar to the application having the undesired application permission and having a permission set that does not include the undesired application permission;
determining that no applications are available having similar features and a permission set that does not include the undesired application permission and storing the undesired application permission as an application development requirement for use in developing new applications not having the undesired application permission; and
providing a recommendation to an application developer, wherein the recommendation recommends that an application be developed without the undesired application permission.

* * * * *